United States Patent [19]
Peng Hsieh et al.

[11] Patent Number: 5,468,040
[45] Date of Patent: Nov. 21, 1995

[54] POWER-OPERATED AUTOMOBILE SUNSHADE

[76] Inventors: Shih-Fang Peng Hsieh, 2F-3, No. 390, Kuang Fu S. Rd., Sung Shan District; Cheng-Liang Lee, 1F, No. 2, Alley 30, Lane 268, Fu Te St., Sung Shan District, both of Taipei, Taiwan

[21] Appl. No.: 189,635

[22] Filed: Feb. 1, 1994

[51] Int. Cl.⁶ .................. B60J 3/02; E06B 9/72
[52] U.S. Cl. .............. 296/97.4; 296/97.7; 296/97.8; 160/310; 160/370.22
[58] Field of Search ............... 296/97.4, 97.7, 296/97.8, 143; 160/68, 310, 311, 370.2 R, 370.2 A, DIG. 3

[56] References Cited

U.S. PATENT DOCUMENTS

| | | | |
|---|---|---|---|
| 4,765,675 | 8/1988 | Svensson | 296/97.4 |
| 4,836,263 | 6/1989 | Ament | 160/370.2 A X |
| 4,898,224 | 2/1990 | Woodworth | 296/97.8 |
| 4,979,775 | 12/1990 | Klose | 296/97.4 X |
| 5,076,633 | 12/1991 | Hsu et al. | 296/97.8 X |
| 5,085,473 | 2/1992 | Yang | 296/97.8 X |
| 5,291,934 | 3/1994 | Ouvrard et al. | 160/370.2 R X |

FOREIGN PATENT DOCUMENTS

| | | | |
|---|---|---|---|
| 394124 | 10/1990 | European Pat. Off. | 296/97.4 |
| 2588307 | 4/1987 | France | 296/97.4 |
| 3735622 | 5/1989 | Germany | 296/97.4 |

*Primary Examiner*—Dean J. Kramer

[57] ABSTRACT

A power-operated automobile sunshade including a double-threaded screw rod turned by a motor through a single-threaded screw rod via a worm gear to move screw nuts inward toward each other along the double-threaded screw rod so as to move two linked rods in lifting the shade body of a shade roller over the rear windshield of the automobile.

2 Claims, 5 Drawing Sheets

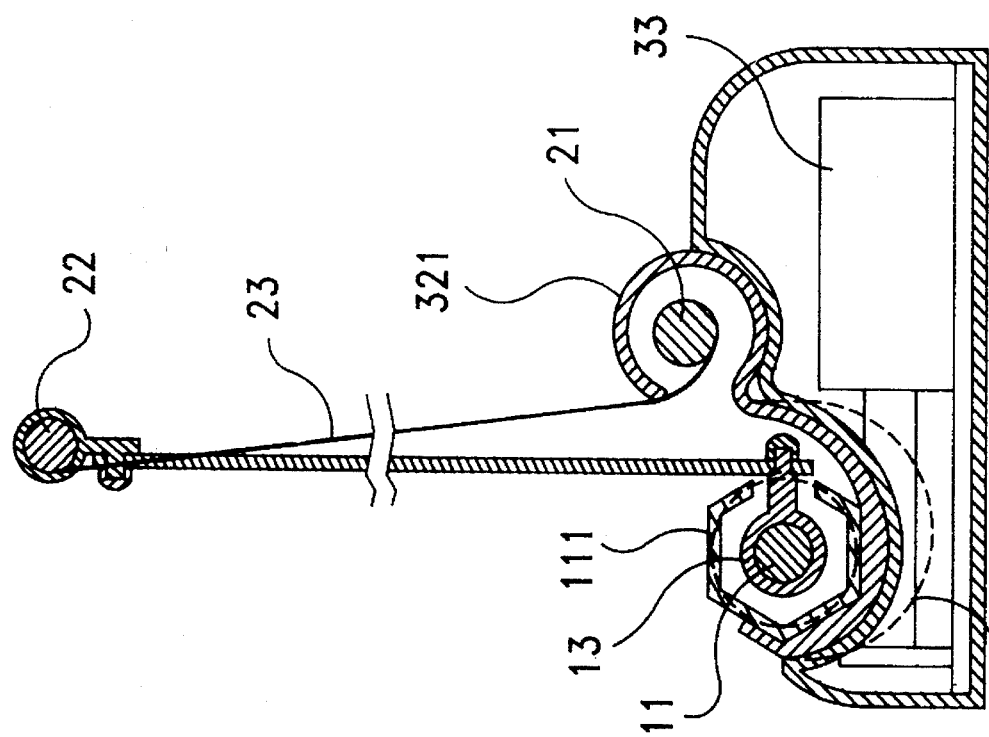
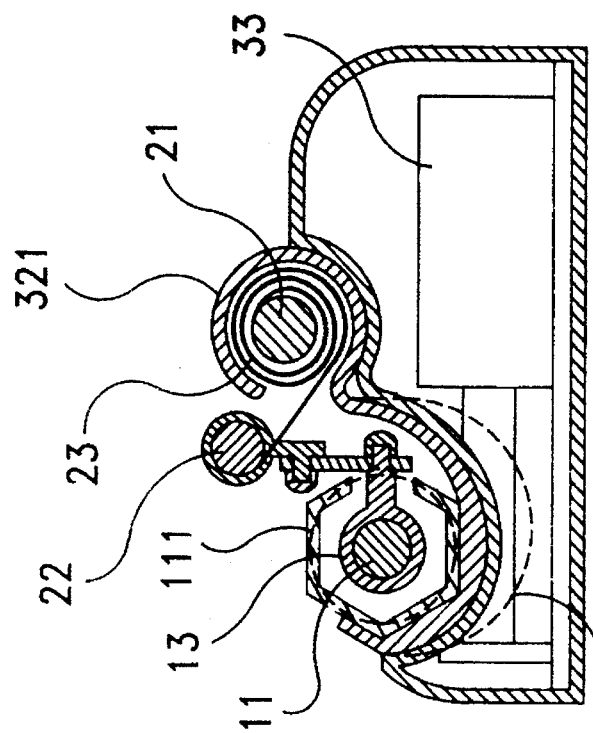

POWER-OPERATED AUTOMOBILE SUNSHADE

BACKGROUND OF THE INVENTION

The present invention relates to a power-operated automobile sunshade which is controlled by a motor through a mechanical transmission mechanism to lift a shade body over the rear windshield for protection against the radiation of the sun.

Various sunshades have been disclosed for protecting the rear windshield from the suns rays. However, these sunshades are still not convenient in use because they must be fitted and collapsed manually. There are still some other power-operated sunshades appearing on the market. However, these power-operated sunshades are not satisfactory in function because or the disadvantages of complicated structure, high cost, and low durability.

SUMMARY OF THE INVENTION

The present invention eliminates the aforesaid disadvantages. It is one object of the present invention to provide a power-operated automobile sunshade which is controlled by a motor to lift or collapse the shade body through a mechanical transmission mechanism. It is another object of the present invention to provide a power-operated automobile sunshade which fully covers the rear windshield when extended out. It is still another object or the present invention to provide a power-operated automobile sunshade which does not hinder the sight through the rear windshield as it is collapsed. It is still another object or the present invention to provide a power-operated automobile sunshade which is suitable for any or a variety or automobiles. It is still another object of the present invention to provide a power-operated automobile sunshade which is compact and lightweight. It is still another object of the present invention to provide a power-operated automobile sunshade which is inexpensive to manufacture. It is still another object of the present invention to provide a power-operated automobile sunshade which can be installed with a third stop lamp. It is still another object of the present invention to provide a power-operated automobile sunshade which can be conveniently controlled by a control button through a control circuit. It is still another object of the present invention to provide a power-operated automobile sunshade which can be controlled by a remote controller.

BRIEF DESCRIPTION OF THE DRAWINGS

FIG. 3A is a side view in section of the power-operated automobile sunshade of FIG. 1 when collapsed;

FIG. 3B is a side view in section of the power-operated automobile sunshade of FIG. 1 when extended out;

DETAILED DESCRIPTION OF THE PREFERRED EMBODIMENT

Figure 1:
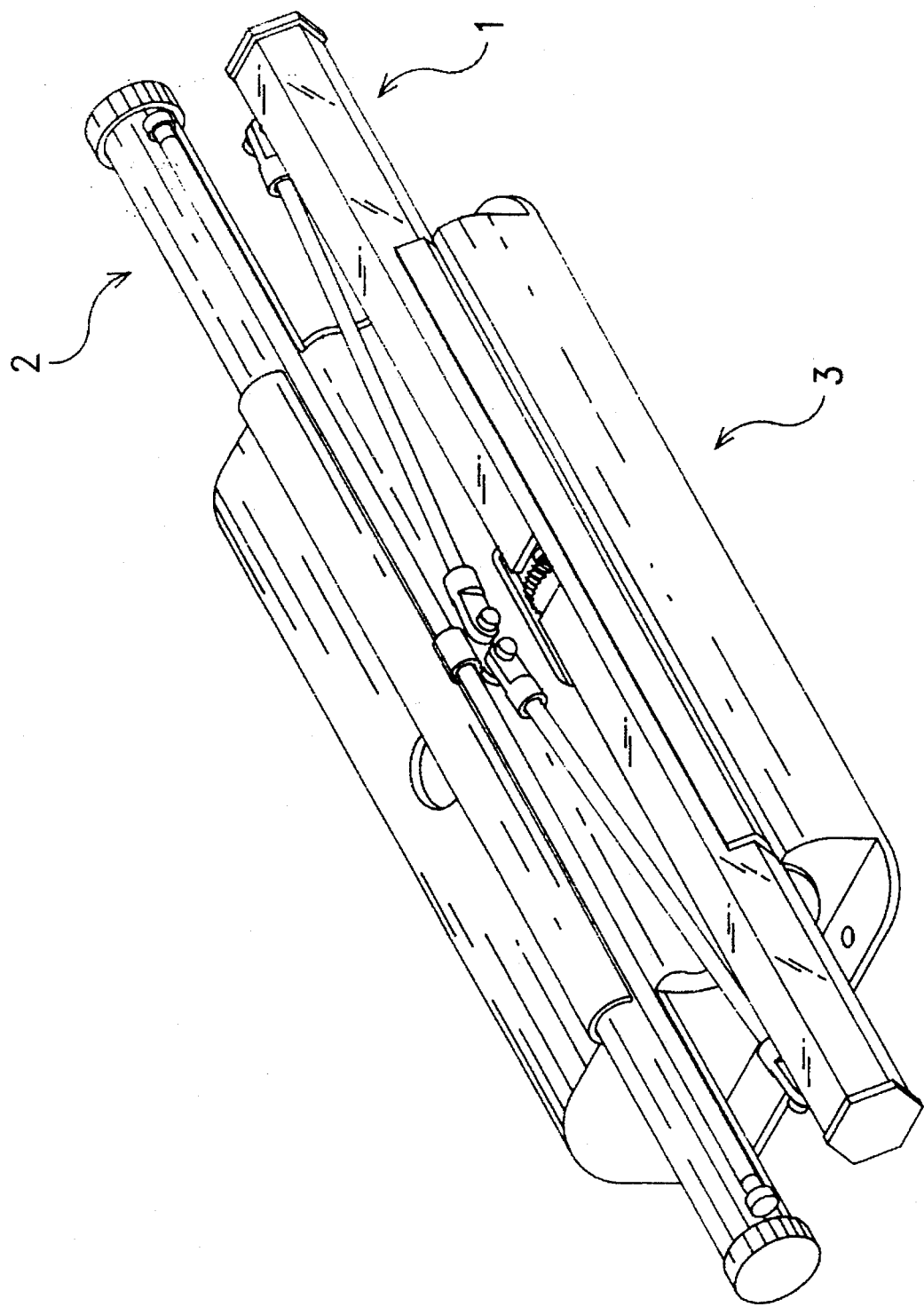
FIG. 1 is a perspective view of a power-operated automobile sunshade according to the present invention.
Figure 2:
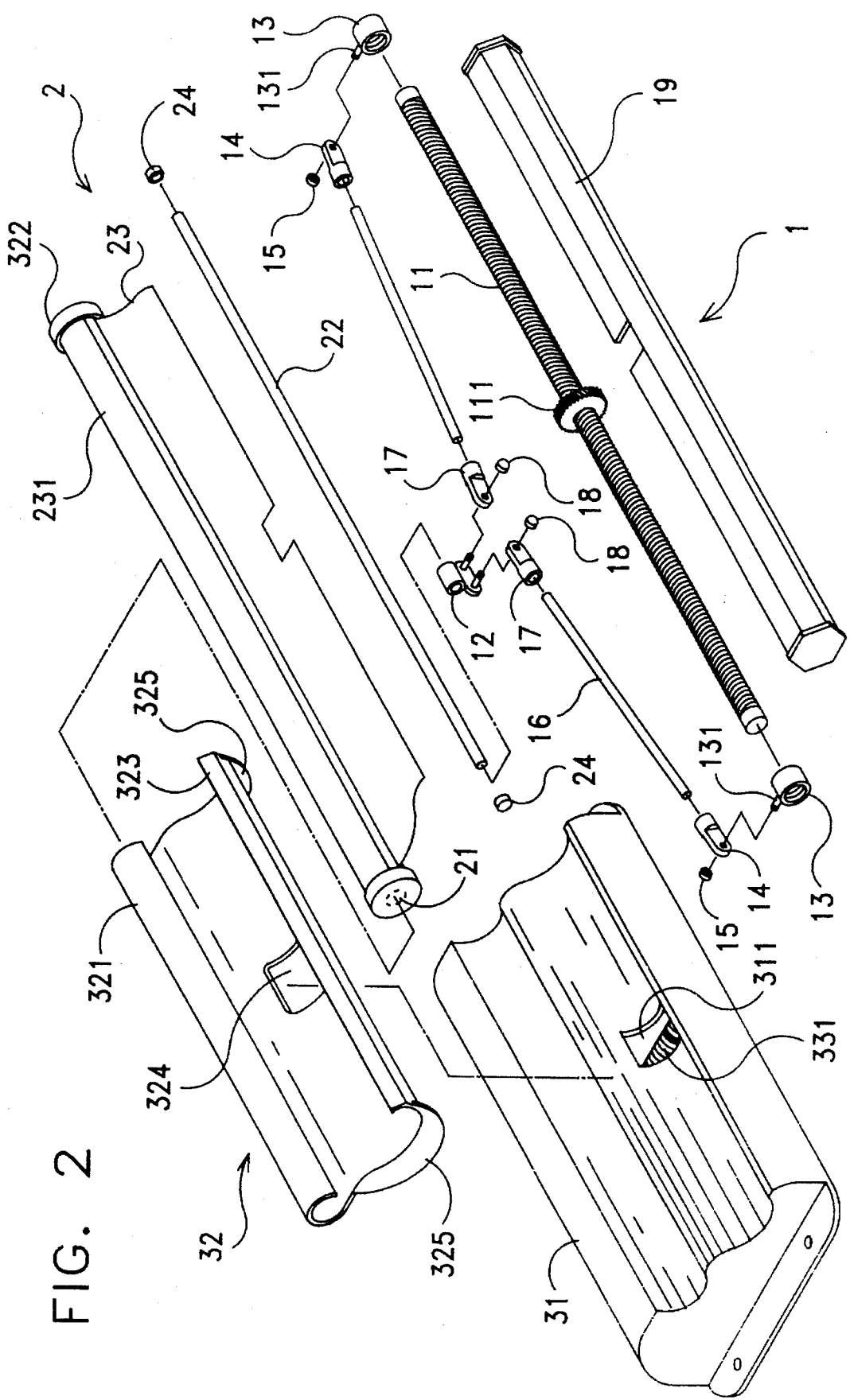
FIG. 2 is an exploded view of the power-operated automobile sunshade of FIG. 1.

Referring to FIGS. 1 and 2, therein illustrated is a power-operated automobile sunshade according to the present invention, generally comprised or a screw rod transmission mechanism 1, a shade roller 2, and a base unit 3. The transmission mechanism 1 is comprised of a double-threaded screw rod 11 having a worm gear 111 in the middle, a guard tube 19 covered around the double-threaded screw rod 11, two screw nuts 13 fastened to the double-threaded screw rod 11 on two opposite ends, each screw nut 13 having a stub screw rod 131, two first end caps 14 respectively fastened to the stub screw rod 131 on either screw nut 13 by a respective locknut 15, two elongated rods 16 respectively connected to the first end caps 14, two second end caps 17 respectively connected to the opposite end or either elongated rod 16, a connector 12 connected between the second end caps 17 by locknuts 18. The two threads of the double-threaded screw rod 11 are disposed in reversed directions and separated by the worm gear 111. The shade roller 2 is comprised of a cylindrical casing 21, a slat 22 inserted through a hole (not shown) on the connector 12 and having two opposite ends fastened with two end caps 24 respectively, and a shade body 23 connected between the slat 22 and a reversing mechanism controlled reel (not shown) inside the cylindrical casing 21. The base unit 3 is generally comprised of a base frame 31, and a carrier 32 fitted over the base frame 31 at the top. The carrier 32 comprises a first two downward clamping plates 325 on two opposite ends thereof respectively clamped on two opposite ends of the base frame 31, a slot 324 in the middle, which receives the worm gear 111 of the transmission mechanism 1, two end caps 322 fastened to two opposite ends of a shade tube 231, a rear flange 321 to hold the cylindrical casing 21 of the shade roller 2 therein, a front flange 323 formed along the front side thereof to hold the guard tube 19 of the transmission mechanism I on the carrier 32 at one side by the rear flange 321. The base frame 31 is made in a hollow structure having a slot 311 in the middle aligned with the slot 324 on the carrier 32. A motor 33 and a single threaded screw rod 331 are respectively installed inside the base frame 31 (see FIG. 3A). The single threaded screw rod 331 is coupled to the motor 33 and meshed with the worm gear 111 of the transmission mechanism 1.

Figure 4:
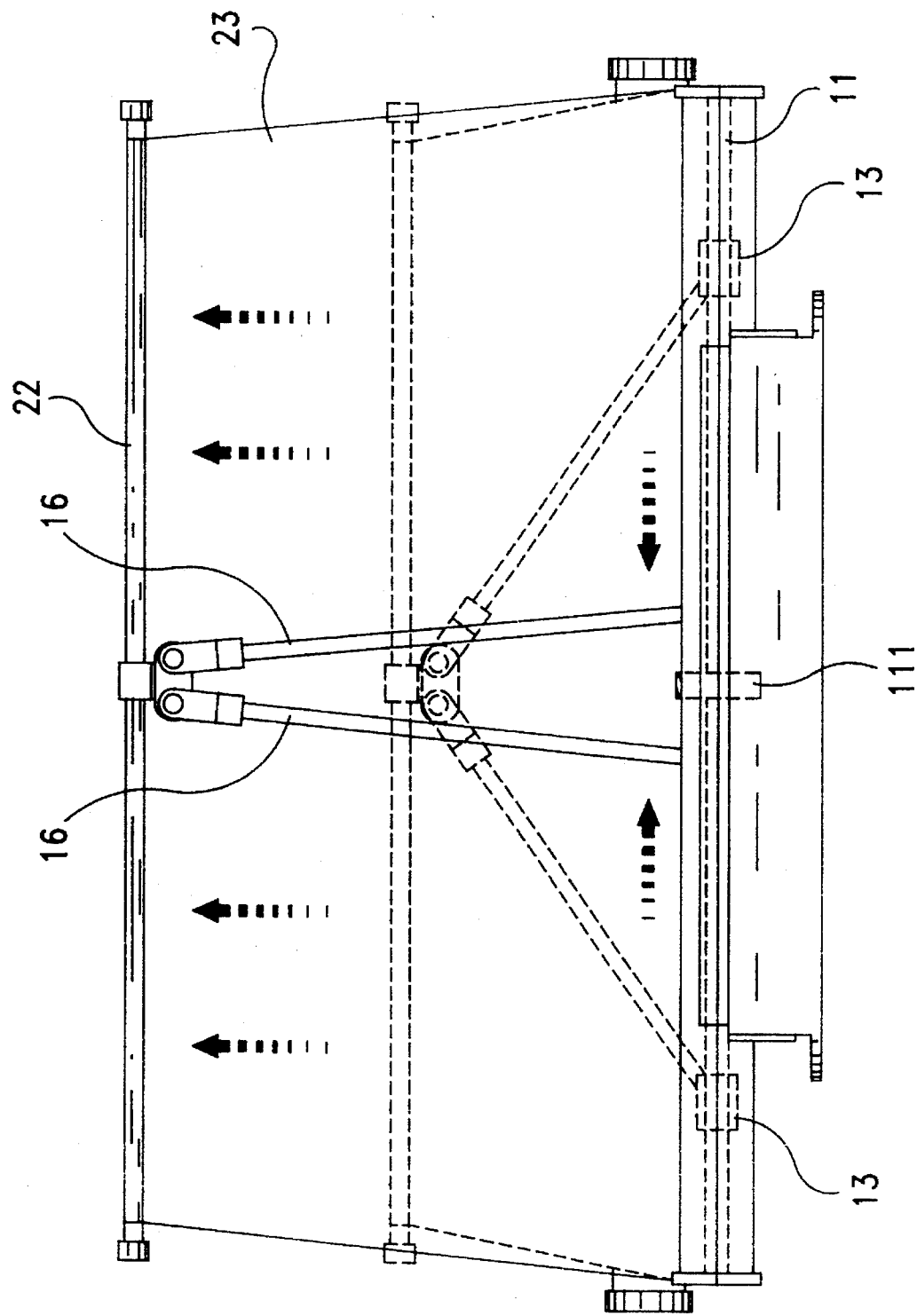
FIG. 4 is a schematic drawing showing the power-operated automobile sunshade of the present invention extended out.

Referring to FIG. 3A, when assembled, the shade body 23 is wound round the reel received inside the cylindrical casing 21 held within the rear flange 321 of the carrier 32, the slat 22 is disposed outside the rear flange 321, and the transmission mechanism 1 is retained in place by the front flange 323, Referring to FIGS. 3B and 4, as the single threaded screw rod 331 is driven by the motor 33 to turn the double-threaded screw rod 11 through the worm gear 111, the screw nuts 13 are forced to turn inwards toward each other along the double-threaded screw rod 11, causing the rods 16 to lift the slat 22, and therefore the shade body 23 is lifted.

Figure 5:
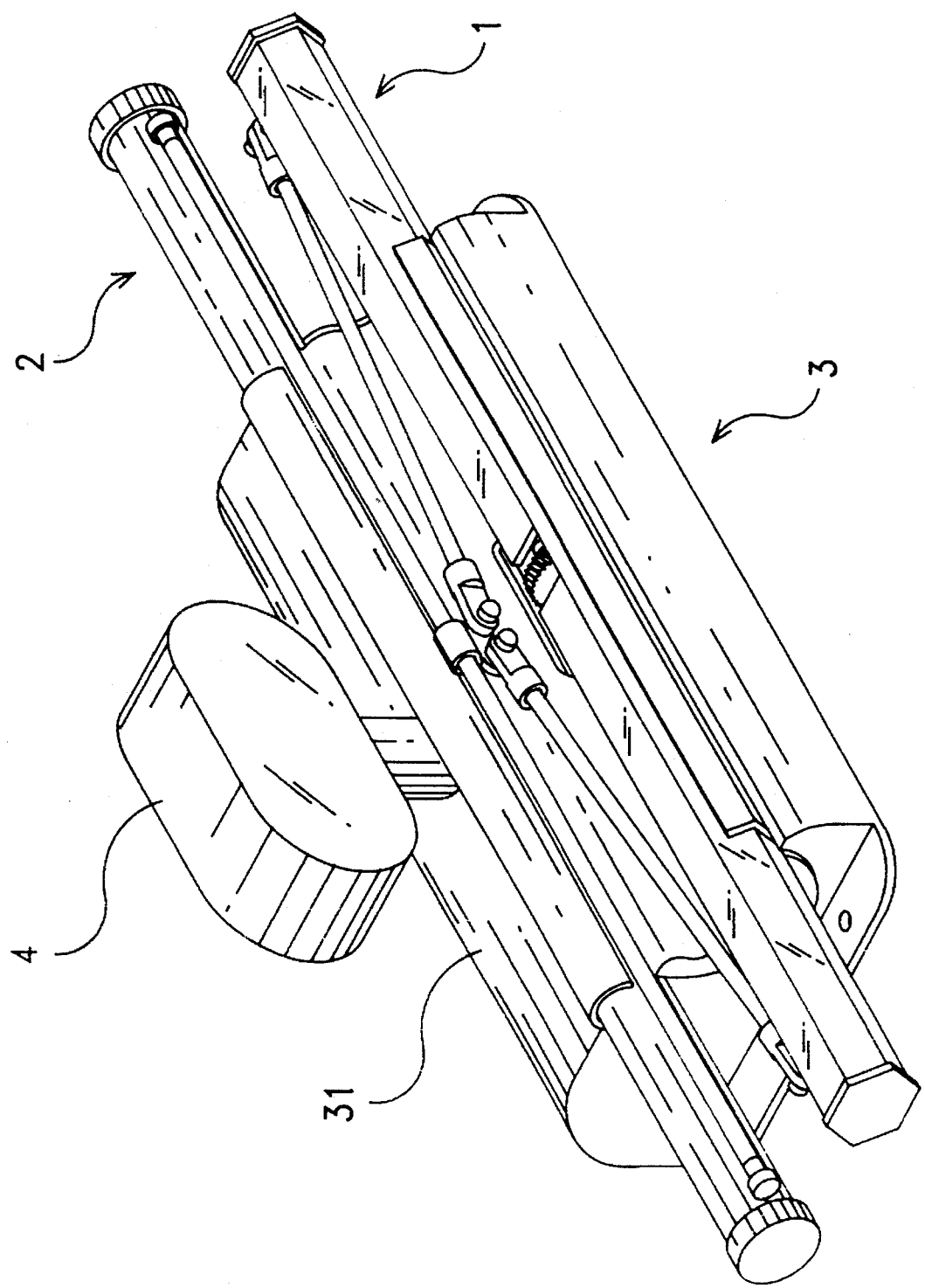
FIG. 5 is similar to FIG. 1, but showing a third stop lamp installed in the base frame of the base unit thereof.

While only one embodiment of the present invention has been shown and described, it will be understood that various modifications and changes could be made without departing from the spirit and scope or the invention. For example: a third stop lamp 4 may be installed in the base frame 31 or the base unit 3 (see FIG. 5); a remote controller may be used to control the operation or the motor 33.

What is claimed is:

1. An automobile sunshade comprising:

a base unit, said base unit comprised of a base frame installed in an automobile at the bottom of the windshield, and a carrier mounted on said base frame by clamping plates thereof, said base frame comprising a motor, a single-threaded screw rod driven by said motor, and a top slot disposed above said single-threaded screw rod, said carrier comprising a rear flange and a front flange respectively and longitudinally disposed on two opposite sides thereof, and a bottom slot in a middle aligned with said top slot;

a transmission mechanism, said transmission mechanism comprised of a double-threaded screw rod having two reversed threads on two opposite ends thereof, a worm gear mounted around said double-threaded screw rod in a middle between said reversed threads and meshed with said single-threaded screw rod, a guard tube covered around said double-threaded screw rod and fastened to said front flange of said carrier, two screw nuts respectively threaded onto said reversed threads, two first end caps respectively affixed to said screw nuts, a connector, two second end caps connected together by said connector, two elongated rods respectively connected between said first end caps and said second end caps, said connector having a center through hole; and a shade roller fastened to said rear flange, said shade roller comprised of a cylindrical casing held within said rear flange, a reversible mechanism controlled reel fastened inside said cylindrical casing, a slat inserted through a center through hole on said connector and disposed outside of a shade tube, and a shade body having one end connected to said reversible mechanism controlled reel and an opposite end connected to said slat;

whereby said screw nuts are moved toward each other along said double-threaded screw rod as said single threaded screw rod is driven by said motor to turn said double-threaded screw rod through said worm gear, causing said elongated rods to move said slat upward in lifting said shade body over the rear windshield of the automobile.

2. The automobile sunshade of claim 1 further comprising a third stop lamp mounted on said base frame of said base unit at a top.

* * * * *